3,468,958
PROCESS FOR OXIDATION OF OLEFINS TO UNSATURATED ALDEHYDES AND ACIDS
James L. Callahan, Cuyahoga County, Ohio, assignor to The Standard Oil Company, Cleveland, Ohio, a corporation of Ohio
No Drawing. Application Jan. 11, 1965, Ser. No. 435,107, which is a division of application Ser. No. 250,008, Jan. 8, 1963, now Patent No. 3,197,419, dated July 27, 1965. Divided and this application Sept. 30, 1965, Ser. No. 505,424
Int. Cl. C07c 27/12, 45/04, 51/32
U.S. Cl. 260—604        8 Claims

ABSTRACT OF THE DISCLOSURE

A process is provided for the catalytic oxidation of olefins to oxygenated hydrocarbons, such as unsaturated aldehydes and acids, for example, propylene to acrolein and isobutylene to methacrolein and methacrylic acid, using catalysts composed of oxides of antimony and iron.

---

This application is a division of copending application Ser. No. 435,107, filed Jan. 11, 1965, which in turn is a division of Ser. No. 250,008, filed Jan. 8, 1963, now Patent No. 3,197,419, dated July 27, 1965, which application is a continuation-in-part of Ser. No. 201,321, filed June 11, 1962 and now abandoned.

This invention relates to the catalytic oxidation of olefins to oxygenated hydrocarbons such as unsaturated aldehydes and acids, for example, propylene to acrolein, and isobutylene to methacrolein and methacrylic acid.

U.S. Patent No. 2,904,580 dated Sept. 15, 1959, describes a catalyst composed of antimony oxide and molybdenum oxide, as antimony molybdate, and indicates its utility in converting propylene to acrylonitrile.

British Patent 864,666 published April 6, 1961 describes a catalyst composed of an antimony oxide alone or in combination with a molybdenum oxide, a tungsten oxide, a tellurium oxide, a copper oxide, a titanium oxide, or a cobalt oxide. These catalysts are said to be either mixtures of these oxides or oxygen-containing compounds of antimony with the other metal, such as antimony molybdate or molybdo-antimonate. These catalyst systems are said to be useful in the production of unsaturated aldehydes such as acrolein or methacrolein from olefins such as propylene or isobutene and oxygen.

British Patent 876,446 published August 30, 1961 describes catalysts including antimony, oxygen and tin, and said to be either mixtures of antimony oxides with tin oxides, or oxygen-containing compounds of antimony and tin such as tin antimonate. These catalysts are said to be useful in the production of unsaturated aliphatic nitriles such as acrylonitrile from olefins such as propylene, oxygen and ammonia.

(I) THE CATALYST

In accordance with the invention, an oxidation catalyst is provided consisting essentially of oxides of antimony and iron. This catalyst is useful not only in the oxidation of olefins to oxygenated hydrocarbons such as unsaturated aldehydes and acids, for example acrolein and methacrolein, and acrylic and methacrylic acids, and the oxidation of olefin-amonia mixtures to unsaturated nitriles such as acrylonitrile and methacrylonitrile but also in the catalytic oxidative dehydrogenation of olefins to diolefins.

The nature of the chemical compounds which compose the catalyst of the invention is not known. The catalyst may be a mixture of antimony oxide or oxides and iron oxide or oxides. It is also possible that the antimony and iron are combined with the oxygen to form an antimonate. X-ray examination of the catalyst system has indicated the presence of a structurally common phase of the antimony type, composed of antimony oxide, and some form of iron oxide. Antimony tetroxide has been identified as present. For the purposes of description of the invention, this catalyst system will be referred to as a mixture of antimony and iron oxides, but this is not to be construed as meaning that the catalyst is composed either in whole or in part of these compounds.

The proportions of antimony and iron in the catalyst system may vary widely. The Sb:Fe atomic ratio can range from about 1:50 to about 99:1. However, optimum activity appears to be obtained at Sb:Fe atomic ratios within the range from 1:1 to 25:1.

The catalyst can be employed without support, and will display excellent activity. It also can be combined with a support, and preferably at least 10% up to about 90% of the supporting compound by weight of the entire composition is employed in this event. Any known support materials can be used, such as, for example, silica, alumina, zirconia, Alundum, silicon carbide, alumina-silica, and the inorganic phosphates, silicates, aluminates, borates and carbonates stable under the reaction conditions to be encountered in the use of the catalyst.

The antimony oxide and iron oxide can be blended together, or can be formed separately and then blended, or formed separately or together in situ. As starting materials for the antimony oxide component, for example, there can be used any antimony oxide, such as antimony trioxide, antimony tetroxide and antimony pentoxide, or mixtures thereof: or a hydrous antimony oxide, meta-antimonic acid, orthoantimonic acid or pyroantimonic acid; or a hydrolyzable or decomposable antimony salt, such as an antimony halide, for example, antimony trichloride, trifluoride or tribromide; antimony pentachloride and antimony pentafluoride, which is hydrolyzable in water to form the hydrous oxide. Antimony metal can be employed, the hydrous oxide being formed by oxidizing the metal with an oxidizing acid such as nitric acid.

The iron oxide component can be provided in the form of ferrous, ferric or ferrous-ferric oxides, or by precipitation in situ from a soluble iron salt such as the nitrate, acetate, or a halide such as the chloride. Free iron can be used as a starting material, and if antimony metal is also employed, the antimony can be converted to the oxide and the iron to the nitrate simultaneously by oxidation in hot nitric acid. A slurry of hydrous antimony oxide in nitric acid can be combined with a solution of an iron salt such as ferric nitrate, which is then precipitated in situ as ferric hydroxide by making the solution alkaline with ammonium hydroxide, the ammonium nitrate and the other ammonium salts being removed by filtration of the resulting slurry.

It will be apparent from the above that ferrous and ferric bromides, chlorides, fluorides and iodides, nitrates, acetates, sulfites, sulfates, phosphates, thiocyanates, thiosulfates, oxalates, formates and hydroxides can be employed as the source of the iron oxide component.

The catalytic activity of the system is enhanced by heating at an elevated temperature. Preferably, the catalyst mixture is dried and heated at a temperature of from about 500 to about 1150° F. preferably at about 700 to 900° F. for from two to twenty-four hours. If activity then is not sufficient, the catalyst can be further heated at a temperature above about 1000° F. but below a temperature deleterious to the catlayst at which it is melted or decomposed, preferably from about 1400° F. to about 1800° F. for from one to forty-eight hours, in the presence of air or oxygen. Usually this limit is not reached before 2000° F. and in some cases this temperature can be exceeded.

In general, the higher the activation temperature, the less time required to effect activation. The sufficiency of activation at any given set of conditions is ascertained by a spot test of a sample of the material for catalytic activity. Activation is best carried out in an open chamber, permitting circulation of air or oxygen, so that any oxygen consumed can be replaced.

The antimony oxide-iron oxide catalyst composition of the invention can be defined by the following empirical formula:

$$Sb_aFe_bO_c$$

where $a$ is 1 to 99, $b$ is 50 to 1, and $c$ is a number taken to satisfy the average valences of antimony and iron in the oxidation states in which they exist in the catalyst as defined by the empirical formula above. Thus, the Sb valence may range from 3 to 5 and the Fe valence from 2 to 3.

This catalyst system is useful in the oxidation of olefins to oxygenated compounds, such as aldehydes and acids, in the presence of oxygen, and in the oxidation of olefins to unsaturated nitriles in the presence of oxygen and ammonia. Nitriles and oxygenated compounds such as aldehydes and acids can be produced simultaneously using process conditions within the overlapping ranges for these reactions, as set forth in detail below. The relative proportions of each that are obtainable will depend on the catalyst and on the olefin. The same catalyst may produce predominantly the nitrile with propylene and predominantly the aldehyde and/or acid with isobutylene. The term "oxidation" as used in this specification and claims encompasses the oxidation to aldehydes and acids and to nitriles, all of which conversions require oxygen as a reactant.

(II) OXIDATION OF OLEFINS TO ALDEHYDES AND ACIDS

The reactants used in the oxidiation to oxygenated compounds are oxygen and an olefin having only three carbon atoms in a straight chain such as propylene or isobutylene, or mixtures therof.

The olefins may be in admixture with paraffinic hydrocarbons, such as ethane, propane, butane and pentane, for example, a propylene-propane mixture may constitute the feed. This makes it possible to use ordinary refinery streams without special preparation.

The temperature at which this oxidation is conducted may vary considerably depending upon the catalyst, the particular olefin being oxidized and the correlated conditions of the rate of throughput or contact time and the ratio of olefin to oxygen. In general, when operating at pressures near atmospheric, i.e., −10 to 100 p.s.i.g. temperatures in the range of 500 to 1100° F. may be advantageously employed. However, the process may be conducted at other pressures, and in the case where superatmospheric pressures, e.g., above 100 p.s.i.g. are employed, somewhat lower temperatures are feasible. In the case where this process is employed to convert propylene to acrolein, or isobutylene to methacrolein and methacrylic acid, a temperature range of from 750 to 950° F. has been found to be optimum at atmospheric pressure.

While pressures other than atmospheric may be employed, it is generally preferred to operate at or near atmospheric pressure, since the reaction proceeds well at such pressures and the use of expensive high pressure equipment is avoided.

The apparent contact time employed in the process is not critical and may be selected from a broad operable range which may vary from 0.1 to 50 seconds. The apparent contact time may be defined as the length of time in seconds which the unit volume of gas measured under the conditions of reaction is in contact with the apparent unit volume of the catalyst. It may be calculated, for example, from the apparent volume of the catalyst bed, the average temperature and pressure of the reactor, and the flow rates of the several components of the reaction mixture.

The optimum contact time, will, of course, vary depending upon the olefin being treated, but in the case of propylene and isobutylene the preferred apparent contact time is 0.5 to 15 seconds.

A molar ratio of oxygen to olefin between about 0.5:1 to 5:1 generally gives the most satisfactory results. For the conversion of propylene to acrolein, and isobutylene to methacrolein and methacrylic acid, a preferred ratio of oxygen to olefin is from about 1:1 to about 2:1. The oxygen used in the process may be derived from any source; however, air is the least expensive source of oxygen, and is preferred for that reason.

We have also discovered that the addition of water to the reaction mixture has a marked beneficial influence on the course of the reaction in that it improves the conversion and the yield of the desired product. The manner in which water affects the reaction is not fully understood but the theory of this phenomenon is not deemed important in view of the experimental results we have obtained. Accordingly, we prefer to include water in the reaction mixture. Generally, a ratio of olefin to water in the reaction mixture of from 1:0.5 to 1:10 will give very satisfactory results, and a ratio of from 1:1 to 1:6 has been found to be optimum when converting propylene to acrolein, and isobutylene to methacrolein and methacrylic acid. The water, of course, will be in the vapor phase during the reaction.

Inert diluents such as nitrogen and carbon dioxide may be present in the reaction mixture.

In general, any apparatus of the type suitable for carrying out oxidation reactions in the vapor phase may be employed for the execution of the process. The process may be operated continuously or intermittently, and may employ a fixed bed with a large particulate or pelleted catalyst, or a so-called "fluidized" bed of catalyst. The fluidized bed permits a closer control of the temperatures of the reaction, as is well known to those skilled in the art, and a fixed bed gives closer control of contact time.

The reactor may be brought to the reaction temperature before or after the introduction of the vapors to be reacted. In a large scale operation, it is preferred to carry out the process in a continuous manner and in this system the recirculation of unreacted olefin and/or oxygen is contemplated. Periodic regeneration or reactivation of the catalyst is also contemplated. This may be accomplished, for example, by contacting the catalyst with air at an elevated temperature.

The unsaturated carbonyl product or products may be isolated from the gases leaving the reaction zone by any appropriate means, the exact procedure in any given case being determined by the nature and quantity of the reaction products. For example, the excess gas may be scrubbed with cold water or an appropriate solvent to remove the carbonyl product. In the case where the products are recovered in this manner, the ultimate recovery from the solvent may be by any suitable means such as distillation. The efficiency of the scrubbing operation may be improved when water is employed as the scrubbing agent by adding a suitable wetting agent to the water. If desired, the scrubbing of the reaction gases may be preceded by a cold water quench of the gases which of itself will serve to separate a significant amount of the carbonyl products. Where molecular oxygen is employed as the oxidizing agent in this process, the resulting product mixture remaining after the removal of the carbonyl product may be treated to remove carbon dioxide with the remainder of the mixture comprising any unreacted olefin and oxygen being recycled through the reactor. In the case where air is employed as the oxidizing agent in lieu of molecular oxygen, the residual product after separation of the carbonyl product may be scrubbed with a non-polar solvent, e.g., a hydrocarbon fraction, in order to uncover unreacted olefin and in this case the remaining gasses may be discarded. An inhibitor to prevent polymerization of the unsaturated products, as is well known in the art, may be added at any stage.

The following examples, in the opinion of the inventors, represent preferred embodiments of the catalyst system of the invention, and of the processes of oxidation of olefins therewith.

EXAMPLE 1

A catalyst system having an Sb:Fe ratio of 8.7:1 was prepared according to the following procedure. 45 g. of antimony metal, finely ground, was dissolved in 186 cc. of nitric acid (specific gravity 1.42) and heated until the evolution of oxides of nitrogen had ceased. To this was added a solution of 17.2 g. of ferric nitrate nonahydrate dissolved in 200 cc. of water. The mixture was neutralized with 150 cc. of 28% ammonium hydroxide to a pH of 8, and the resulting slurry filtered and washed with 300 cc. of water in three portions. The filler cake was dried at 120° C. overnight, calcined at 800° F. for 12 hours, and heat-treated in a muffle furnace open to the atmosphere for 12 hours. The activated catalyst was then pelleted.

A portion of catalyst was used for the conversion of propylene to acrolein, using a bench scale reactor, having a capacity of approximately 100 ml. of catalyst, in a fixed bed. The feed gases were metered by Rotameters, and water was fed by means of a Sigma motor pump through capillary copper tubing. The feed ratio propylene/air/nitrogen/water was 1/10/10/1. The apparent contact time was 5 seconds and the temperature 900° F. A catalyst charge of 90 ml. was employed. The total conversion per pass was 39.4% with a good yield of acrolein, and only a small amount of acetaldehyde.

EXAMPLE 2

The following procedure was employed to prepare a catalyst having an Sb:Fe atomic ratio of 8.8:1 supported on silica. 180 g. of antimony metal (less than 80 mesh) was dissolved in 720 cc. of hot concentrated nitric acid. After all of the metal was oxidized, heating was continued until the mixture was evaporated almost to dryness. At this point, 67.3 g. of ferric nitrate $Fe(No_3)_3 \cdot 9H_2O$ was then added with stirring. The mixture was then transferred to a ball mill and mixed for four hours. After this, the mixture was removed from the mill utilizing about 100 mls. of water for the removal and to this was then added 328 g. of a silica sol (30.6% $SiO_2$) available under the trademark "Ludon." The mixture was stirred and to it was added 2.5 g. ammonium nitrate ($NH_4NO_3$) and upon slight heating the mixture gelled. The catalyst mixture was then dried for 8 hours at 120–130° C., then calcined for 8 hours at 800° F., and then treated at 1600° F. for 12 hours. The activity of this catalyst for the conversion of propylene to acrolein was determined in a fixed bed reactor at a temperature of 775° F. a contact time of 3 seconds and a mole ratio of propylene/air equivalent to 1/10. The per pass conversion of propylene to acrolein was 63%.

EXAMPLE 3

A silica supported catalyst was prepared following the procedure of Example 2 except that the proportions of the components were such as to provide 62.8 wt. percent of antimony and iron oxides with an Sb:Fe atomic ratio of 5.7:1 and 37.2% $SiO_2$.

This catalyst was used for the conversion of isobutylene to methacrolein and methacrylic acid, using 306 g. of catalyst in a fixed bed reactor in the form of a 5 foot long pipe, ½ inch in diameter. The feed was passed through this bed, which was charged with 306 g. of catalyst. The feed was metered with Rotameters, and the water was fed by means of a Sigma pump through capillary copper tubing. The temperature was 700° F. the contact time was 4 seconds, and the mole ratio of isobutylene/air/$H_2O$ was 1/8/4. The per pass conversion of isobutylene was 29.9%, of which 22.8% was methacrolein, 5.0% methacrylic acid, and 2.1% acetaldehyde.

I claim:
1. The process for the manufacture of unsaturated aldehydes and acids from olefins which comprises the step of contacting in the vapor phase, at a temperature below about 1100° F. at which aldehyde and acid formation proceed, a mixture of oxygen and an olefin having only three carbon atoms in a straight chain, said mixture having a molar ratio of oxygen to olefin of from about 0.5:1 to about 5:1, with a catalyst composition consisting essentially of oxides of antimony and iron as essential catalytic ingredients, the Sb:Fe atomic ratio being within the range from about 1:50 to about 99:1.

2. The process of claim 1, in which the olefin is propylene.

3. The process of claim 1, in which the olefin is isobutylene.

4. The process of claim 1, in which the Sb:Fe atomic ratio in the catalyst is within the range of from about 1:1 to about 25:1.

5. The process of claim 1, in which the catalyst composition is carried on a support.

6. The process of claim 5, in which the support is silica.

7. The process of claim 1, in which the catalyst composition is activated by heating at a temperature above about 500° F. but below a temperature deleterious to the catalyst.

8. The process of claim 1, in which the catalyst has a composition corresponding to the empirical chemical formula $Sb_aFe_bO_c$, where $a$ is a number within the range from about 1 to about 99, $b$ is a number within the range from about 50 to 1, and $c$ is a number taken to satisfy the average valences of antimony and iron in the oxidation states in which they exist in the catalyst.

References Cited

FOREIGN PATENTS 605,502    7/1941    Belgium.

LEON ZITVER, Primary Examiner

R. H. LILES, Assistant Examiner

U.S. Cl. X.R.

260—533